United States Patent
Chini et al.

(10) Patent No.: US 9,225,556 B2
(45) Date of Patent: Dec. 29, 2015

(54) MULTIPLEXED PACKET LOCAL AREA NETWORKING USING AN ETHERNET PHYSICAL LAYER DEVICE

(71) Applicant: Broadcom Corporation, Irvine, CA (US)

(72) Inventors: Ahmad Chini, Mission Viejo, CA (US); Mehmet Vakif Tazebay, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 150 days.

(21) Appl. No.: 13/927,438

(22) Filed: Jun. 26, 2013

(65) Prior Publication Data

US 2014/0362865 A1  Dec. 11, 2014

Related U.S. Application Data

(60) Provisional application No. 61/832,424, filed on Jun. 7, 2013.

(51) Int. Cl.
*H04L 12/66* (2006.01)
*H04L 12/64* (2006.01)

(52) U.S. Cl.
CPC ............ *H04L 12/66* (2013.01); *H04L 12/6418* (2013.01)

(58) Field of Classification Search
CPC ....... H04L 69/00; H04L 12/66; H04L 12/403; H04L 12/4013
See application file for complete search history.

(56) References Cited

U.S. PATENT DOCUMENTS

| | | | |
|---|---|---|---|
| 2006/0212604 A1* | 9/2006 | Beckhoff et al. | 709/251 |
| 2007/0058682 A1* | 3/2007 | Albrecht et al. | 370/503 |

OTHER PUBLICATIONS

Mehmet Tazebay, From CAN to BroadR-Reach®: The Development of Wireline Techologies for Automotive Communications, Feb. 19, 2013.

* cited by examiner

*Primary Examiner* — Albert T Chou
(74) *Attorney, Agent, or Firm* — Foley & Lardner LLP; Christopher J. McKenna; Daniel E. Rose

(57) ABSTRACT

Multiplexed packet local area networking using an Ethernet physical layer device. In one embodiment, a network device having dual port Ethernet physical layer devices can be configured to receive a packet on a first Ethernet port. The network device can extract first packet data that is destined for the network device from the data section of the packet and insert second packet data that is destined for the gateway node into the packet to produce a modified packet. The modified packet is then transmitted by the network device over a second Ethernet port.

19 Claims, 7 Drawing Sheets

| NODE 1 | NODE 1 | NODE 2 | NODE 3 | NODE 4 | NODE 4 | NODE 4 | NODE 5 |
|---|---|---|---|---|---|---|---|

FIG. 5

MULTIPLEXED PACKET LOCAL AREA NETWORKING USING AN ETHERNET PHYSICAL LAYER DEVICE

This application claims priority to provisional application No. 61/832,424, filed Jun. 7, 2013, which is incorporated herein by reference in its entirety.

BACKGROUND

1. Field of the Invention

The present invention relates generally to Ethernet networks and, more particularly, to multiplexed packet local area networking using an Ethernet physical layer device.

2. Introduction

Electronic control units (ECUs) are playing an increasingly important role in various industrial and commercial control applications. One example of such a control application is an automotive vehicle network. Automotive networks are increasingly incorporating ECUs, sensors, actuators, etc. to improve safety, reduce emissions, reduce fuel consumption, improve driver comfort, increase driver visibility of vehicle status, etc. For example, ECUs, sensors, actuators, etc. can be used in various subsystems such as a power train subsystem, chassis subsystem, driver assist subsystem, infotainment subsystem, or the like.

The requirements on the performance of such networks has increased dramatically as highly interconnected systems have emerged that execute complex, real-time distributed control algorithms. For example, proper functioning of passenger safety mechanisms (e.g., airbags, brake assist, etc.) require high-performance, low latency connections between interconnected systems. Notwithstanding such performance characteristics, it is still desired that such networks minimize cost and minimize wiring harness weight, all while maximizing reliability.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 5 illustrates an example of packet multiplexing.

DETAILED DESCRIPTION

Figure 1:
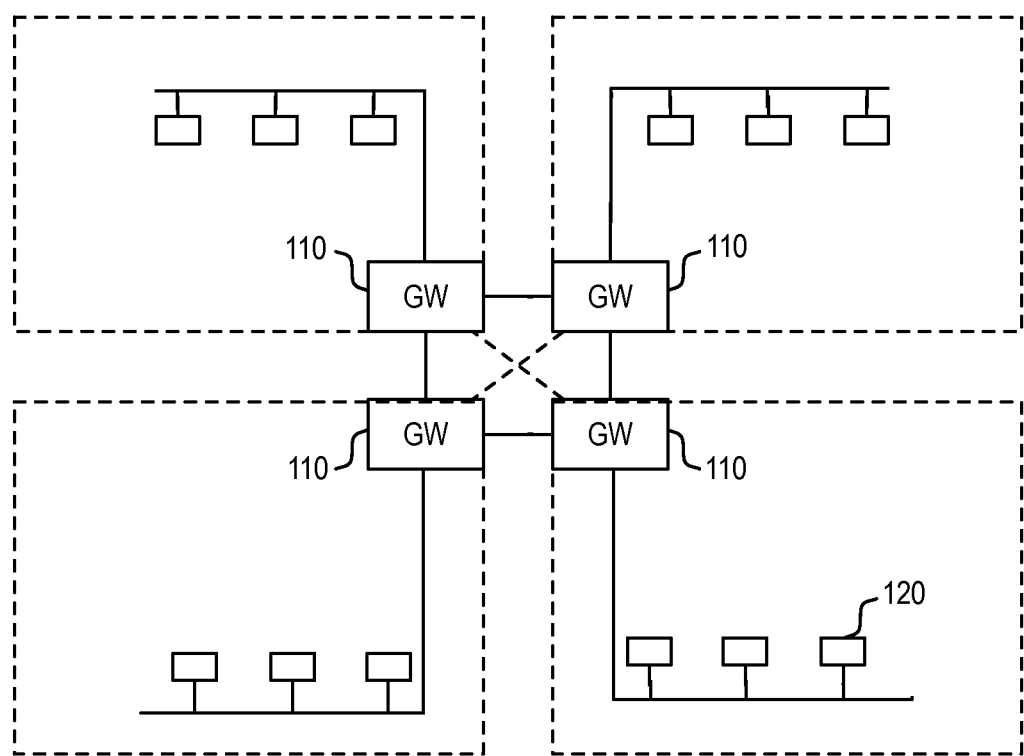
FIG. 1 illustrates an example of a network topology within an automotive vehicle network environment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Control networks such as those used in automotive networking are rapidly growing in the marketplace. ECUs in such control networks can operate with low to medium data rate support, which can easily be accommodated by existing Ethernet technology. Advantages of Ethernet technology include a broad ecosystem that spans various media specifications (e.g., backplane, twinax, twisted-pair, coax, optical fiber, etc.) and distances (e.g., 1 meter to greater than 10 kilometers.). The broad ecosystem has produced vast amounts and variety of proven physical layer devices (PHYs), media access control (MAC) products, switches, etc. In general, Ethernet is a known technology that continues to expand in reach and competitiveness in various markets and applications.

In applying Ethernet technology to control networks it is recognized that the unique requirements of control networks and applications differs from that of conventional Ethernet networks and applications. For example, in an automotive network environment, bus and ring network topologies and other shared medium networks are often desired to reduce the amount of cabling that contributes to the weight of the entire wiring harness. Moreover, in the example of an automotive network environment, space can be severely limited. Where the control networks are used for mission-critical applications, packet collision is unacceptable and latency has to be minimized to avoid disruption or delay in the mission critical application.

In the present invention, such needs exhibited by control networks can be met through a network device having a first Ethernet port that is configured for receiving a packet having a preamble, a start frame delimiter field, and a data section, the data section having multiplexed therein a plurality of packet data that are respectively destined for a plurality of network devices from a gateway node, a packet multiplexer/demultiplexer module that is configured to extract first packet data that is destined for the network device from the data section of the packet and insert second packet data that is destined for the gateway node into the packet to produce a modified packet, wherein the second packet data is inserted at one or more locations in the data section of the packet that were previously occupied by the extracted first packet data, and a second Ethernet port that is configured to transmit the modified packet. In the present invention, it is recognized that the minimum packet length and source/destination MAC address overheads in Ethernet networks can be too large when considering the very short control messages used by the control network. In one embodiment, the network device also includes a multiplexer port that is coupled to the packet multiplexer/demultiplexer module. In one embodiment, the multiplexer port can operate at 10 Mbps, while the first and second Ethernet ports operate at 100 Mbps. The output of the multiplexer port can be used to facilitate low to medium data rate support for the network device.

The network device such as that described above can be used to facilitate a shared medium network process that is enabled by the dual Ethernet port PHY technologies. In one embodiment, a process is provided that includes receiving, at a first Ethernet port of a first of a plurality of network devices in a local area network, a packet having a preamble, a start frame delimiter field, and a data section, the data section having multiplexed therein a plurality of packet data that are respectively destined for the plurality of network devices from a gateway node, extracting, by the first network device from the packet, first packet data that is destined for the first network device from the data section of the packet, inserting, by the first network device into the packet, second packet data that is destined for the gateway node, the inserting producing a modified packet, wherein the second packet data is inserted at one or more locations in the data section of the packet that were previously occupied by the extracted first packet data; and transmitting, by a second Ethernet port of the first network device, the modified packet onto the local area network.

In the present invention, a packet multiplexing scheme is provided that can be used on a shared media network that is used by network devices having dual port Ethernet PHY technologies. As will be come apparent in the following description, the principles of the present invention can be used with various Ethernet technologies, data rates and cable types. To illustrate the features of the present invention, reference will be made to an automotive vehicle network environment. Such an example is not intended to be limiting. Rather, it should be recognized that the principles of the present invention can be applied to any network environment that can benefit from a shared media network.

FIG. 1 illustrates an example of a automotive network environment that incorporates network devices incorporating features of the present invention. As illustrated, the automotive network environment includes multiple domains that are facilitated by domain gateways 110. Communication between a gateway 110 and the plurality of network devices 120 within its domain can be based on a packet multiplexing scheme of the present invention.

In various embodiments, a domain can include those networked components that relate to a power train function, a chassis function, a body control function, a drive assist function, an infotainment function, etc. Domain gateways 110 can be further interconnected with each other via a mesh backbone network.

Each domain gateway 110 can be configured to communicate with a plurality of network devices 120 that can represent ECUs, sensors, actuators, or the like in a control network. In the example of the automotive network environment, the plurality of network devices 120 are coupled to domain gateway 110 via a shared media such as one unshielded twisted pair (UTP) media. An example of communication over one UTP media is Broadcom's BroadR-Reach® technology, which leverages proven BASE-T PHYs in providing a short-reach 100 Mbps channel.

Figure 2A:
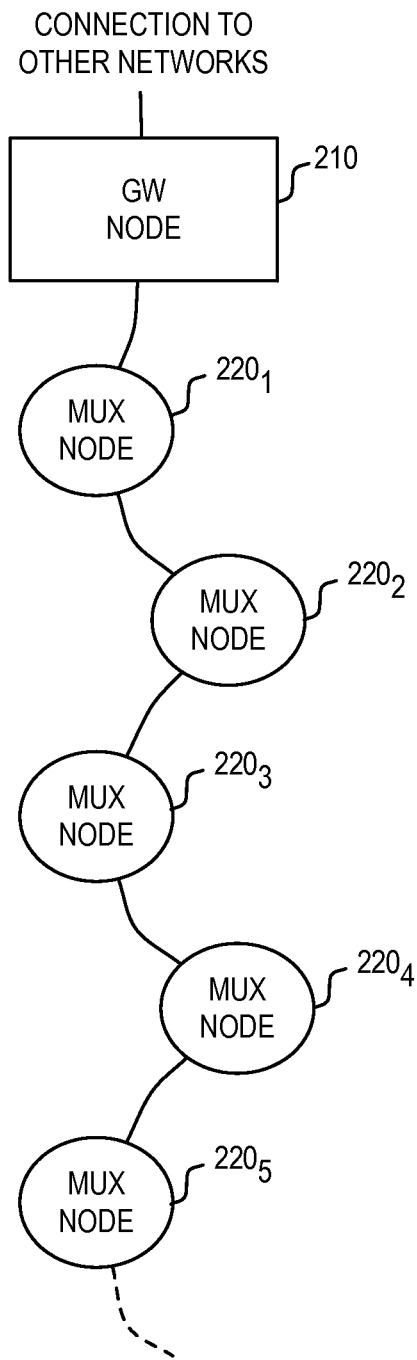
FIGS. 2A and 2B illustrate example embodiments of a network domain having a plurality of multiplexer nodes.
Figure 2B:
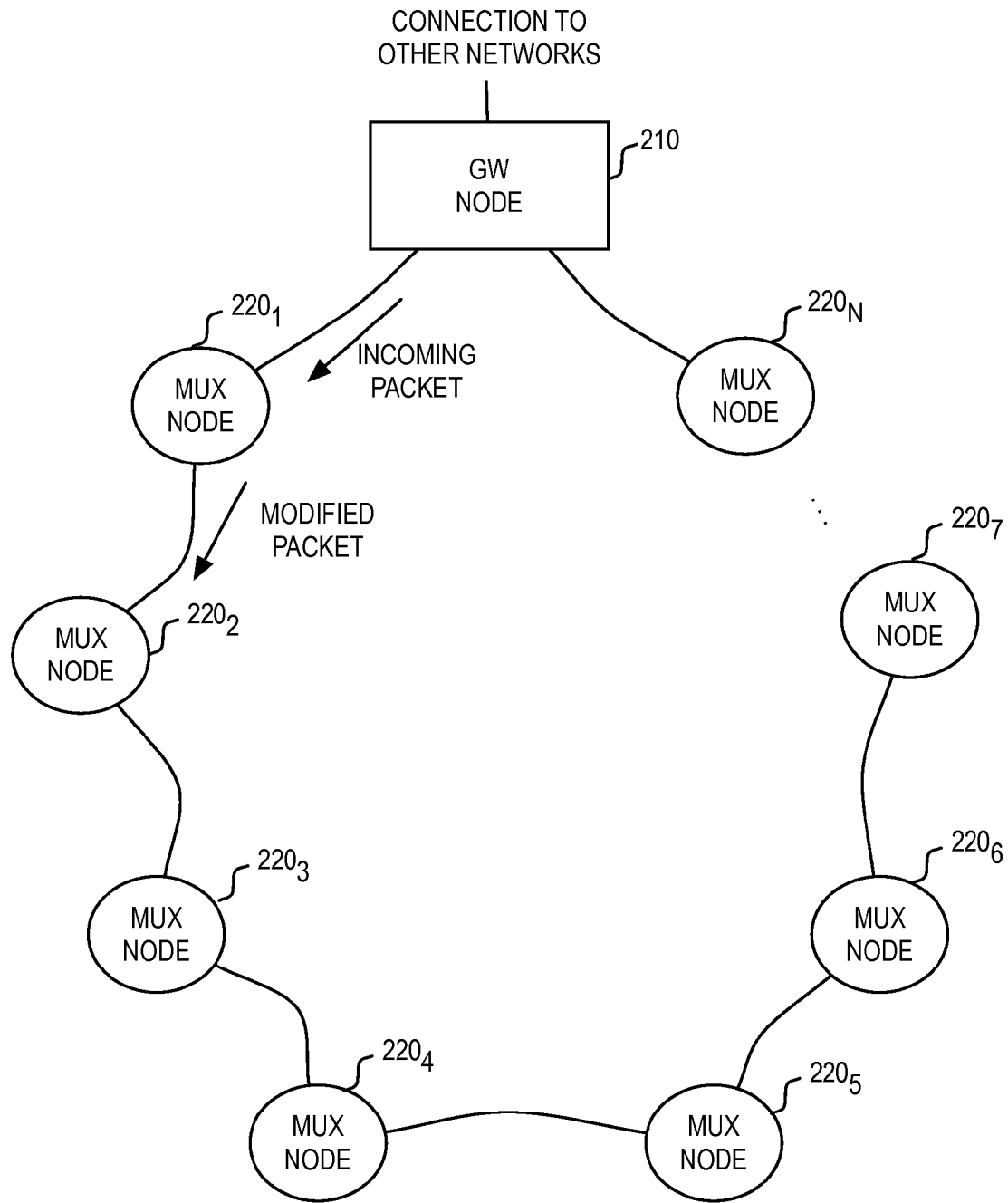

FIG. 2A illustrates a communication framework within a single domain. As illustrated, gateway node 210 is configured for communication with a plurality of network devices that can be referred to as multiplexer nodes $220_1$-$220_N$. As would be appreciated, the particular number of multiplexer nodes within a given domain would be implementation dependent. In the embodiment of FIG. 2A, the plurality of multiplexer nodes $220_1$-$220_N$ are connected in a bus topology. In another embodiment such as that illustrated in FIG. 2B, the plurality of multiplexer nodes $220_1$-$220_N$ are connected in a ring topology. In each of these embodiments, the plurality of multiplexer nodes $220_n$ include two Ethernet port PHYs to facilitate connection to neighboring nodes.

In the present invention it is recognized that local area networking of the type used for control purposes typically carries shorter messages that can be enabled via low to medium data rate support. It is a feature of the present invention that these shorter messages from a plurality of multiplexer nodes $220_1$-$220_N$ can be multiplexed into a single packet for communication over a shared medium.

Figure 3:
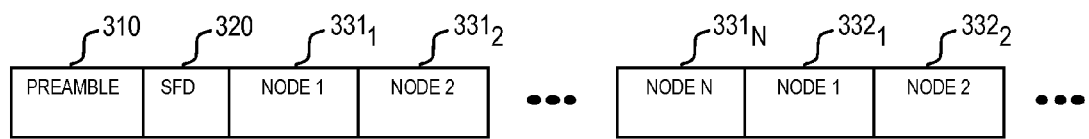
FIG. 3 illustrates an example embodiment of a multi-node multiplexed packet format.

One embodiment of a multi-node multiplexed packet format is illustrated in FIG. 3. In the illustrated embodiment, the packet begins with preamble field 310 and start frame delimeter (SFD) field 320. Unlike conventional Ethernet packets that continue with a destination address field, a source address field, and length/type data field prior to a packet data section, the packet of the present invention follows preamble field 310 and SFD field 320 with multiplexed data from the plurality of multiplexer nodes $220_1$-$220_N$.

In the illustrated embodiment, SFD field 320 is followed with a first packet data segment $331_1$ associated with multiplexer node $220_1$, a first packet data segment $331_2$ associated with multiplexer node $220_2$, a first packet data segment $331_3$ associated with multiplexer node $220_3$, etc. until the first packet data segment $331_N$ associated with multiplexer node $220_N$ is reached. Following the first packet data segment $331_N$ associated with last multiplexer node $220_N$ is a second packet data segment $332_1$ associated with multiplexer node $220_1$, a second packet data segment $332_2$ associated with multiplexer node $220_2$, a second packet data segment $332_3$ associated with multiplexer node $220_3$, etc. until the second packet data segment $332_N$ associated with multiplexer node $220_N$ is reached. This multiplexing process continues as packet data segments that are associated with the plurality of multiplexer nodes $220_1$-$220_N$ continue to be multiplexed into the packet in round robin fashion.

From the perspective of multiplexer node $220_1$, the combination of packet data segments $331_1$, $332_1$, $333_1$, etc. would produce the packet data for multiplexer node $220_1$. Similarly, from the perspective of multiplexer node $220_2$, the combination of packet data segments $331_2$, $332_2$, $333_2$, etc. would produce the packet data for multiplexer node $220_2$. In one embodiment, each packet data segment is 4-bits long. As would be appreciated, the particular length of the packet data segments would be implementation dependent.

In operation, packets originate in gateway node 210 with multiplexed data included therein for all other multiplexer nodes $220_1$-$220_N$. When the packet travels through the network reaching another multiplexer node, the multiplexed packet data pertaining to that multiplexer node is extracted from the packet and replaced with data from that multiplexer node that is to be delivered back to gateway node 210. In the example embodiment of the ring topology in FIG. 2B, the packet would circulate back to the gateway node 210 after going through all other multiplexer nodes in the return path of the network to gateway node 210.

For example, consider multiplexer node $220_1$. A downlink packet that is transmitted by gateway node 210 is received by multiplexer node $220_1$ on a first Ethernet port. Multiplexer node $220_1$ is configured to extract the relevant packet data segments (e.g., packet data segments $331_1$, $332_1$, $333_1$) from the received downlink packet. The combination of the relevant packet data segments would represent the data message from gateway node 210 to multiplexer node $220_1$.

In establishing two-way communication between gateway node 210 and multiplexer node $220_1$ on the ring, multiplexer node $220_1$ is also configured to insert packet data into the received downlink packet. Specifically, multiplexer node $220_1$ is configured to insert packet data segments of a message from multiplexer node $220_1$ to gateway node 210 in the same locations of the packet (e.g., packet data segments $331_1$, $332_1$, $333_1$) at which the packet data segments were previously extracted. In other words, multiplexer node $220_1$ is configured to extract data and insert data from the same locations in the downlink packet. The remaining locations of the packet data segments that are associated with the other multiplexer nodes $220_2$ to $220_N$ would be left undisturbed. After multiplexer node $220_1$ inserts packet data into the packet to create a modified packet, the modified packet is then transmitted as an uplink packet by multiplexer node $220_1$ onto a second Ethernet port for delivery to multiplexer node $220_2$. Each of multiplexer nodes $220_2$ to $220_N$ in the return path to gateway node 210 would be configured to remove data and insert data from the uplink packet.

Eventually, the uplink packet is returned to gateway node 210 via transmission by multiplexer node $220_N$. At that point, the packet data segments can include message data from each of the multiplexer node $220_1$ to $220_N$ to gateway node 210. In general, the result of extraction and insertion of data by each multiplexer node $220_1$ to $220_N$ is the creation of two-way communication between gateway node 210 and each of the multiplexer node $220_1$ to $220_N$ via a single packet that is separately modified as it traverses the shared medium.

In one embodiment, addresses of the multiplexer nodes are pre-assigned. In one example, the pre-assignment can be facilitated through pin selections. In another example, the pre-assignment can be facilitated through register programming. In general, any mechanism that enables the gateway node and multiplexer nodes to commonly identify assigned locations in the packet for extraction and insertion of one or more packet data segments can be used.

In one embodiment, multiplexer nodes can also communicate with other multiplexer nodes. This communication can be facilitated by the gateway node. In one embodiment, a set of bits (e.g., three bits for an 8-node network) can be used to establish destination addresses on the local area network.

Figure 4:
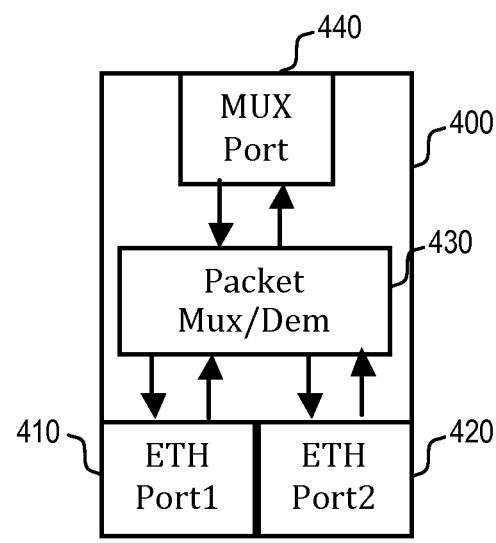
FIG. 4 illustrates an example embodiment of a multiplexer node.

FIG. 4 illustrates an example embodiment of a multiplexer node. As illustrated, multiplexer node 400 includes Ethernet port PHY 410 and Ethernet port PHY 420. Ethernet port PHYs 410, 420 enable multiplexer node 400 to connect to two adjacent multiplexer nodes. Coupled to Ethernet port PHYs 410, 420 is packet multiplexer/demultiplexer module 430. Packet multiplexer/demultiplexer module 430 includes minimal logic for multiplexing/demultiplexing data to/from a packet. With a pipeline implementation, the delay incurred while passing through the packet multiplexer/demultiplexer module 430 can be as small as one or two packet data segments. In an example of a eight-node ring, the total delay incurred by passing a packet through all eight multiplexer nodes would be less than 10 μs if each Ethernet link segment on the ring has a delay of about 1 μs. This speed of transport can enable an implementation where control messages do not have to be prioritized. All messages and all of the multiplexer nodes would have guaranteed access to bandwidth with minimal delays.

In one embodiment, the packet multiplexer/demultiplexer module 430 can be implemented as an additional digital block into a two-port Ethernet PHY. In an alternative embodiment, packet multiplexer/demultiplexer module 430 can be implemented in another chip, FPGA/CPLD or other programmable devices.

As illustrated, packet multiplexer/demultiplexer module 430 is also coupled to multiplexer port 440. Multiplexer port 440 can provide the low to medium data rate support for that node. The data rate of multiplexer port 440 would be a fraction of the data rate of Ethernet port PHYs 410, 420. For example, if eight nodes exist in the local area network and the Ethernet port PHYs 410, 420 operate at 100 Mbps, then multiplexer port 440 would provide a data rate of 100 Mbps/8=12.5 Mbps to the multiplexer node.

Here, it should be recognized that for various applications, different Ethernet ports may be used at speeds of 10 Gbps or higher. The number of multiplexer nodes per local area network, the number of ports per node and bandwidth per multiplexer port are all configurable using proper Ethernet technology and packet multiplexing format. Different multiplexer nodes can also be assigned different bandwidth if needed.

For example, different multiplexer nodes can be assigned a different number of slots in the round robin multiplexing scheme. This enables each multiplexer node to be configured with a customized percentage of the overall shared media bandwidth. Consider the example of packet multiplexing illustrated in FIG. 5. In this example, eight slots that each correspond to 100/8=12.5 Mbps of available bandwidth are assigned to five multiplexer nodes. Node 1 is configured to use two slots, node 4 is configured to use three slots, while nodes 2, 3 and 5 are each configured to use one slot. With this configuration, node 1 would have 25 Mbps of available bandwidth, node 2 would have 12.5 Mbps of available bandwidth, node 3 would have 12.5 Mbps of available bandwidth, node 4 would have 37.5 Mbps of available bandwidth, and node 5 would have 12.5 Mbps of available bandwidth. As would be appreciated, the amount of bandwidth per slot can also be configured based on the total number of round robin slots available to the group of multiplexer nodes. In one embodiment, the multiplexer port can be configured as a conventional 10 BASE-T port. In other embodiments, the multiplexer port can have a serial or parallel interface definition.

Where the local area network is configured as a ring network, the data packets circulating in one direction in the ring provide full duplex communication for each multiplexer node as data is read and replaced going through each of the multiplexer nodes. Since the backbone Ethernet is a full duplex network, the data packets may be circulated clockwise and counter clockwise at the same time, thereby providing twice the bandwidth.

In one embodiment, the extra bandwidth can be used to double the number of multiplexer nodes. In another embodiment, the extra bandwidth can be used to provide two multiplexer ports on each multiplexer node, or to double the bandwidth on single multiplexer ports.

In one embodiment, the extra bandwidth can be used to provide data redundancy or fault tolerance in the local area network. For example, if one node or a cable link fails on the ring, the multiplexer nodes that are adjacent to the failed node or link may communicate back to the gateway using the opposite direction of communication. As would be appreciated, various failure recovery schemes can be defined that leverage the additional bandwidth. Significantly, if one-pair Ethernet technology is used for the ring backbone, a fault tolerant network is achieved with only a single UTP cable.

Figure 6:
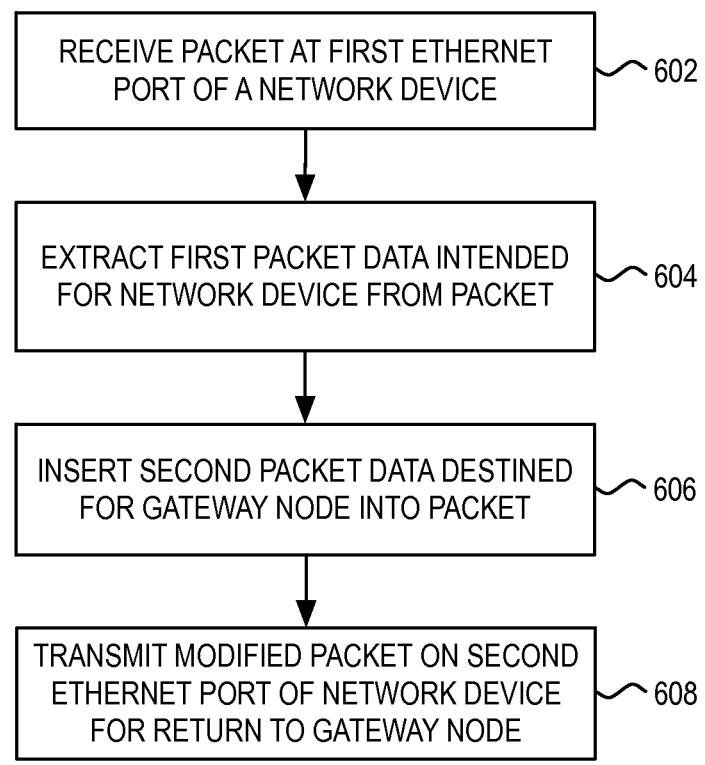
FIG. 6 illustrates a flowchart of a process of the present invention.

Having described a multiplexed packet mechanism for enabling shared media networking, reference is now made to the flowchart of FIG. 6, which illustrates a flowchart of a process of the present invention. As illustrated, the process begins at step 602 where a downlink packet is received at a first Ethernet port of a network device. The downlink packet that is received at the first Ethernet port can be routed to a multiplexer/demultiplexer module.

The multiplexer/demultiplexer module can be configured to extract, at step 604, first packet data that is intended for the network device. Extraction of the first packet data from the received downlink packet can be based on a pre-assigned address for the network device. For example, the pre-assigned address can correspond to one or more slots in a round robin multiplexing scheme. At step 606, the multiplexer/demultiplexer module can also be configured to insert second packet data into the received packet. Here, the locations of insertion can correspond to the locations of extraction such that the packet data that is associated with other network devices is left undisturbed. In the example of a round robin multiplexing scheme, the collection of packet data segments can be combined to form a message that is received by the network device or sent to the gateway node. In one embodiment, the collection of packet data segments also includes a set of cyclic redundancy check (CRC) bits that provide a parity bit based error detection scheme.

It should be noted that the particular mechanism by which the packet data is extracted and inserted into the packet would be implementation dependent. While an example of a round robin multiplexing scheme was provided, such an example was not intended to be limiting. In general, any scheme that enables a network devices to distinguish the locations of relevant packet data segments in a manner that does not prevent other network devices from extracting their relevant packet data segments can be used. As such, it should be recognized that any multiplexing scheme that enables a network device to extract and insert one or more packet data segments into a packet while not interfering with the usage of the packet by other network devices can be used.

The extraction of one or more packet data segments and the subsequent insertion of one or more packet data segments produced a modified packet. At step 608, such a modified packet is transmitted as an uplink packet by the network device on a second Ethernet port for eventual return to a gateway node. As would be appreciated, such an uplink packet can be further modified by other network devices prior to reaching the gateway node. The modifications by the collective set of network devices enables two-way communication between the gateway node and each of the network devices using the shared media.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   receiving, at a first Ethernet port of a first of a plurality of network devices in a local area network, a packet having a preamble, a start frame delimiter field, and a data section, the data section having multiplexed therein a plurality of packet data that are respectively destined for the plurality of network devices from a gateway node including first packet data that is destined for the first network device occupying a first predetermined position in the data section of the packet;
   extracting, by the first network device from the packet, the first packet data that is destined for the first network device from the first predetermined position in the data section of the packet;
   inserting, by the first network device into the packet, second packet data that is destined for the gateway node, the inserting producing a modified packet, wherein the second packet data is inserted at the first predetermined position in the data section of the packet that was previously occupied by the extracted first packet data and the inserted second packet data does not extend into a predetermined position in the data section of the packet adjacent to the first predetermined position; and
   transmitting, by a second Ethernet port of the first network device, the modified packet onto the local area network.

2. The method of claim 1, wherein the receiving comprises receiving at 100 Mbps.

3. The method of claim 1, wherein the receiving comprises receiving at a single wire pair port.

4. The method of claim 1, wherein the first network device is a device on an automotive vehicle network.

5. The method of claim 1, wherein the data section of the packet contains segments of each of the plurality of packet data that are inserted into the data section in a round robin order.

6. The method of claim 1, wherein the extracting comprises extracting multiple packet segments of the first packet data that are multiplexed in separately identified locations of the data section of the packet.

7. The method of claim 1, further comprising forwarding the extracted first packet data to a multiplexer port that operates at a lower rate than the first Ethernet port.

8. A network device, comprising:
   a first Ethernet port that is configured for receiving a packet having a preamble, a start frame delimiter field, and a data section, the data section having multiplexed therein a plurality of packet data that are respectively destined for a plurality of network devices from a gateway node and respectively occupying a plurality of predetermined positions in the packet corresponding to the plurality of network devices;
   a packet multiplexer/demultiplexer module that is configured to extract first packet data that is destined for the network device from a first predetermined position in the data section of the packet corresponding to the network device including the packet multiplexer/demultiplexer and insert second packet data that is destined for the gateway node into the first predetermined position in the packet to produce a modified packet, such that the second packet data is inserted at one or more locations in the data section of the packet that were previously occupied by the extracted first packet data and the inserted second packet data does not extend into a predetermined position in the data section of the packet adjacent to the first predetermined position; and
   a second Ethernet port that is configured to transmit the modified packet.

9. The network device of claim 8, wherein the first port is a 100 Mbps port.

10. The network device of claim 8, wherein the first port is a single wire pair port.

11. The network device of claim 8, wherein the network device is a device on an automotive vehicle network.

12. The network device of claim 8, wherein the data section of the packet contains segments of each of the plurality of packet data that are inserted into the data section in a round robin order.

13. The network device of claim 8, wherein the packet multiplexer/demultiplexer module is configured to extract multiple packet segments of the first packet data that are multiplexed in separately identified locations of the data section of the packet.

14. The network device of claim 8, further comprising a multiplexer port that is coupled to the packet multiplexer/demultiplexer module, the multiplexer port operating at a lower rate than either the first Ethernet port or the second Ethernet port.

15. A method performed by a network device, comprising:
transmitting, by a first Ethernet port of the network device, a first packet having a preamble, a start frame delimiter field, and a first data section, the first data section having multiplexed therein a plurality of first packet data that are respectively destined for a plurality of network devices; and receiving, by a second Ethernet port of the network device, a second packet having a preamble, a start frame delimiter field, and a second data section, the second data section having multiplexed therein a plurality of second packet data that are respectively received from the plurality of network devices;

wherein a first item of the plurality of first packet data is in a predetermined first location in the first data section corresponding to a first network device of the plurality of network devices to which the first item is destined; and wherein a corresponding first item of the plurality of second packet data, received from the first network device, is in the same predetermined first location in the second data section.

16. The method of claim 15, wherein the receiving comprises receiving at a single wire pair port.

17. The method of claim 15, wherein the network device is a gateway device.

18. The method of claim 15, wherein the first data section of the first packet contains segments of each of the plurality of first packet data that are inserted into the first data section in a round robin order.

19. The method of claim 15, wherein transmitting the first packet further comprises transmitting the first packet including the first data section adjacent to the start frame delimiter field.

* * * * *